United States Patent [19]

Renwick

[11] Patent Number: 5,266,023
[45] Date of Patent: Nov. 30, 1993

[54] INJECTION MOLDING NOZZLE HAVING AN ELECTRICAL TERMINAL WITH AN INSULATIVE CONNECTOR.

[75] Inventor: Craig W. Renwick, Georgetown, Canada

[73] Assignee: Craig W. Renwick, Georgetown, Canada

[21] Appl. No.: 953,855

[22] Filed: Sep. 30, 1992

[51] Int. Cl.$^5$ ............................................. B29C 45/20
[52] U.S. Cl. ................................... 425/549; 219/219; 219/421; 264/328.15
[58] Field of Search ............................. 425/549, 568; 264/328.15; 219/219, 421

[56] References Cited

U.S. PATENT DOCUMENTS 4,557,685 12/1985 Gellert ............................... 425/549
4,837,925 6/1989 Gellert ............................... 425/549

Primary Examiner—Tim Heitbrink

[57] ABSTRACT

An injection molding nozzle with an electrical heating element having a terminal for connecting external leads with an insulative connector formed of ceramic material. The insulative connector has a pair of spaced parallel longitudinal bores in which the outer end portions of the heating element conductive wires and the bared inner end portions of the external leads overlap and are secured together by set screws. A steel cap fits over the ceramic connector to protect it and provide the combination with sufficient structural strength to prevent damage during use. A resilient seal mounted between the ceramic connector and the cap also prevents damage to the connector and prevents moisture entering into the connector.

4 Claims, 3 Drawing Sheets

INJECTION MOLDING NOZZLE HAVING AN ELECTRICAL TERMINAL WITH AN INSULATIVE CONNECTOR.

BACKGROUND OF THE INVENTION

This invention relates generally to injection molding and more particularly to a heated nozzle with an electrical terminal having an electrically insulative connector.

Injection molding nozzles having an integral electrical heating element extending to a terminal are well known in the art. The diameter of the conductive wire in the heating element must be larger adjacent the terminal to avoid excessive heat at the terminal. The conductive wire must be electrically connected at the terminal to an external lead or leads and be electrically insulated from the nozzle body which is made of steel.

In the past, this has been provided for low voltage nozzles with only a single external lead by having a layer of insulation between an inner portion of the terminal and an outer portion to which the conductive wire and external lead are both connected. This is shown in U.S. Pat. No. 4,837,925 to Gellert which issued Jun. 13, 1989. Nozzles having terminals to connect both ends of the electrical heating element to separate external leads are more difficult. In addition to overcoming the above problems, electrical separation must be maintained between the two leads and between the two outer end portions of the conductive wire. Also connecting and disconnecting of the external leads must be facilitated, and the terminal must have sufficient structural strength to avoid bending or breaking when this is done. Gellert Canadian patent application serial number 2,057,594-8 filed Dec. 13, 1991 entitled "Method of Making an Injection Molding Nozzle with a Single Heating Element in a Double Channel" shows a nozzle with a terminal for connecting a pair of external leads. Each lead extends into a longitudinal bore in a connector where its bared inner end portion overlaps a respective outer end portion of the conductive wire and they are secured together by a set screw which is screwed into the connector. However, the connector is made of metal and therefore must be surrounded by a separate insulator made of a ceramic material. In addition to requiring the manufacture of both connectors and insulators, this has the disadvantage that installation is relatively difficult because the transverse openings in the insulator must be aligned with the transverse openings in the connector. Also, the terminal must be long enough to allow the insulator to extend out past the metal connector at both ends, and it is difficult to seal the outer end of the terminal against moisture.

SUMMARY OF THE INVENTION

Accordingly, it is an object of the present invention to at least partially overcome the disadvantages of the prior art by providing an injection molding heated nozzle with an electrical terminal having an insulative connector. To this end, in one of its aspects, the invention provides an injection molding nozzle having a body with a rear end, an electrical heating element extending in the body, and an electrical terminal extending outwardly from the body adjacent the rear end of the body, the heating element having at lest one rear portion extending outwardly to the terminal to receive electrical power through at least one external lead, the at least one rear portion of the heating element having an electrically conductive wire surrounded by insulation inside a protective casing, having the improvement wherein the body has a threaded stud projecting outwardly adjacent the rear end of the body, the at least one rear portion of the heating element projects outwardly through the stud with an outer end portion of the conductive wire extending a predetermined distance past the insulation and protective casing, an insulative connector having at least one longitudinal bore with an inner end and an outer end extending therethrough is mounted with the at least one projecting rear portion of the heating element extending outwardly into the at least one longitudinal bore through o the inner end with the outer end portion of the conductive wire to overlap with a bared inner end portion of the at least one external lead inserted inwardly through the outer end of the at least one longitudinal bore, the insulative connector having at least one transverse opening extending into the at least one longitudinal bore, the at least one transverse opening having thread means to receive screw means to secure the overlapping outer end portion of the conductive wire and the inner end portion of the at least on external lead together, a hollow cap having a threaded inner end and an outer end with an opening therethrough to be mounted over the insulative connector and screwed onto the threaded stud to secure the insulative connector in place with the at least one external lead extending inwardly through the opening in the outer end of the cap into the at least one longitudinal bore in the insulative connector.

DETAILED DESCRIPTION OF THE DRAWINGS

Figures 1, 1A:
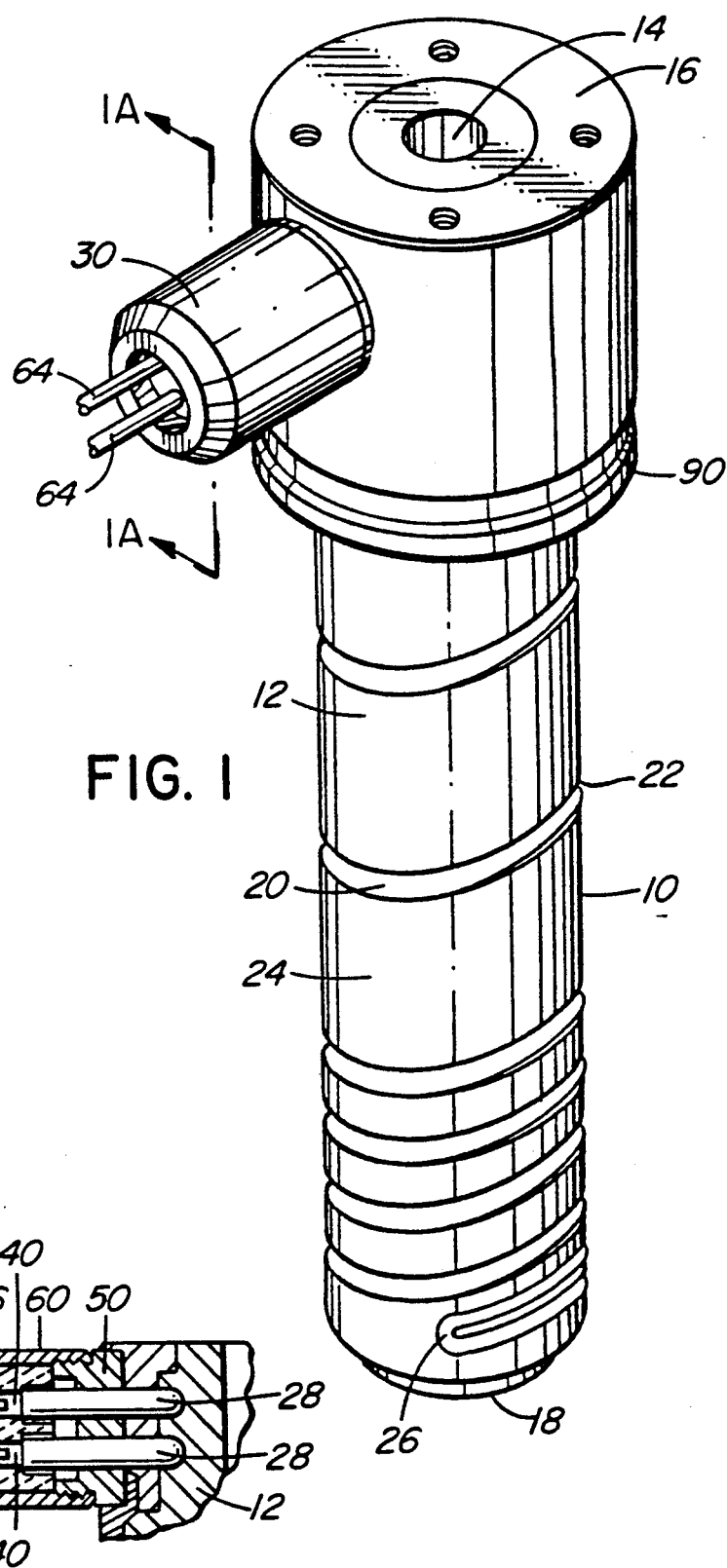
FIG. 1 is an isometric view of an injection molding nozzle with an electrical terminal according to a preferred embodiment of the invention.
FIG. 1A is a sectional view of the terminal seen in FIG. 1.

Reference is first made to FIG. 1 which shows an injection molding nozzle 10 having a steel body 12 with a central melt bore 14 extending therethrough from the rear end 16 to the forward end An electrical heating element 20 is integrally brazed in a spiral channel 22 which extends around the outer surface 24 of the nozzle body 12 In this embodiment, the heating element 20 has a U-shaped bend 26 near the forward end 18 of the body and two rear portions 28 which extend outwardly to an electrical terminal 30 which extends outwardly from the body 12 adjacent the rear end 16. In another embodiment of the invention, a low voltage nozzle is provided having a heating element with one end grounded to the steel body 12 near its forward end and only one rear portion extending outwardly to the electrical terminal.

Figure 2:
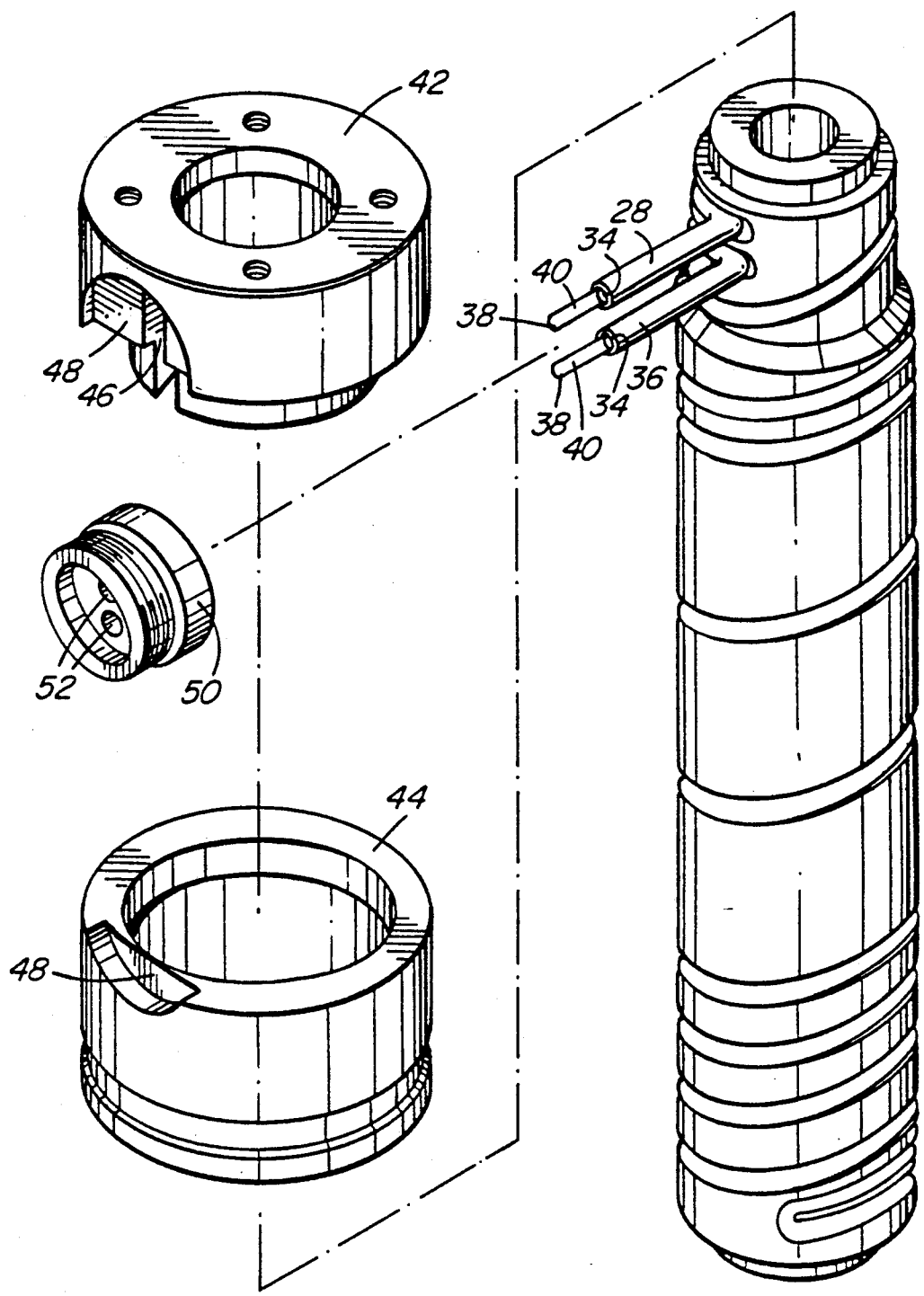
FIG. 2 is an exploded isometric view showing a portion of the nozzle seen in FIG. 1 in position for assembly.
Figure 3A:
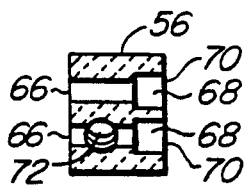
FIG. 3A is a sectional view of the insulative connector.
Figure 3:
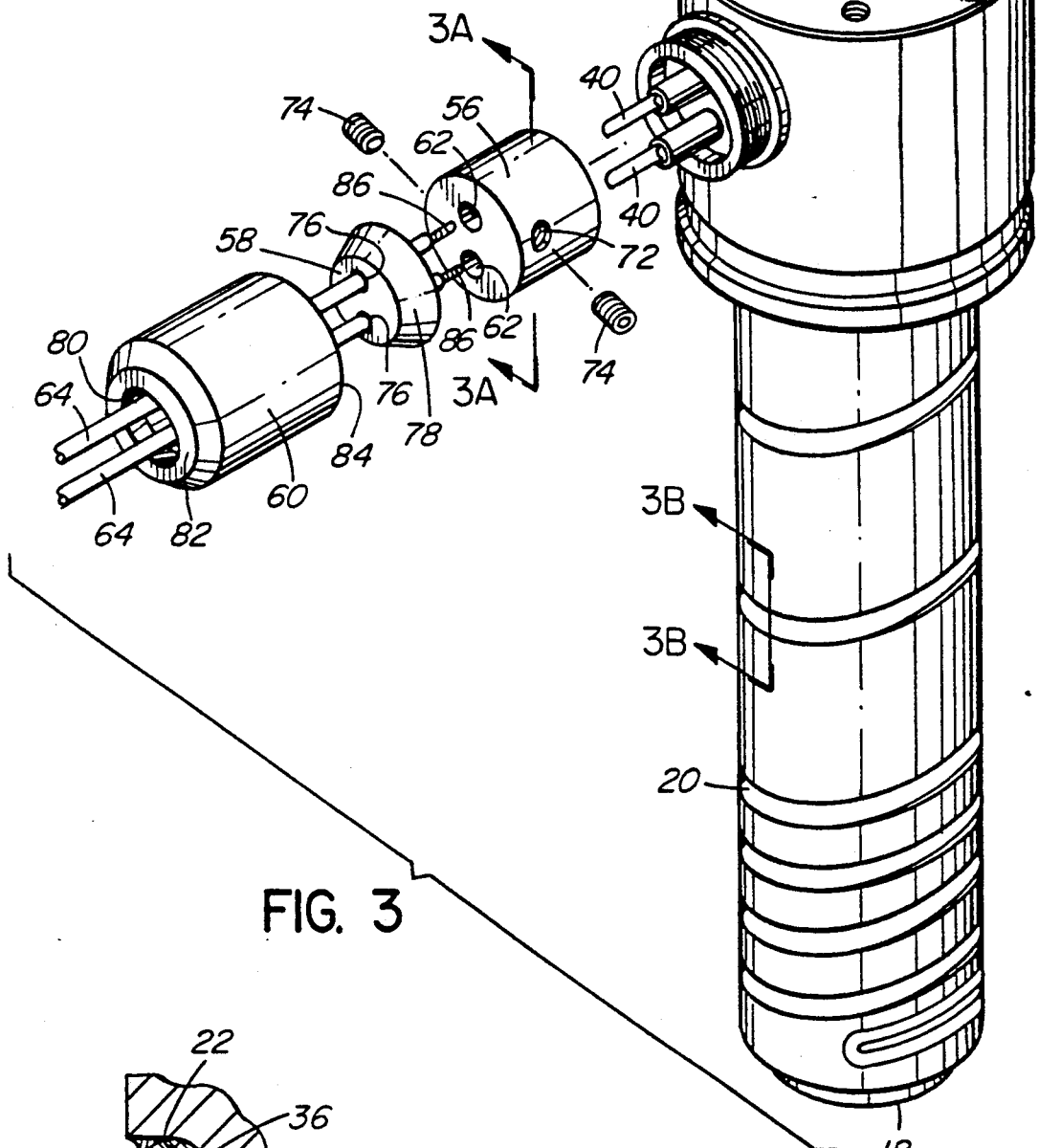
FIG. 3 is an exploded isometric view also showing the terminal and the external leads in position for assembly and connection.
Figure 3B:
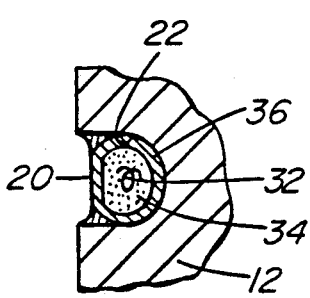
FIG. 3B is a sectional view showing the heating element.

The nozzle 10 is manufactured and the external leads are connected to it as seen in FIGS. 2 and 3. As seen in FIG. 2, the electrical heating element 20 is first wound tightly in the spiral channel 22, with the two rear portions 28 projecting radially outwards in a spaced parallel relationship near the rear end 16 of the body 12. As seen in FIG. 3B, the heating element 20 has a fine coiled resistance wire 32 surrounded by an insulating material 34 such as magnesium oxide powder protected by a steel casing 36. The fine heating wire 32 is connected to larger diameter conductive wires 38 which extends through the insulating material 34 in the rear portions 28 of the heating element 20 so the terminal 30 is not heated. As can be seen, each conductive wire 38 has a bare outer end portion 40 which extends outwardly a predetermined distance past the insulation 34 and the casing 36.

A steel rear collar 42 and interlocking steel forward collar 44 are mounted together at the rear end of the nozzle body 12. The rear collar 42 has a slot 46 through which the two rear portions 28 of the electrical heating element 20 extend. Together the rear and forward collars 42, 44 form a seat 48 in which a threaded steel stud 50 is received. The stud 50 has a pair of spaced parallel bores 52 through which the two rear portions 28 of the electrical heating element 20 extend to ensure they project outwardly in the proper spaced parallel positions.

After these components are assembled together, brazing material such as nickel alloy paste is applied along the joins between them and along the heating element 20 similar to the description in U.S. Pat. No. 4,557,685 to Gellert which issued Dec. 10, 1985. The assembled components are then heated in a vacuum furnace above the melting temperature of the brazing material according to a predetermined cycle. As the furnace is gradually heated, it is evacuated to a relatively high vacuum to remove nearly all of the oxygen. Before the melting temperature of the brazing material is reached, the vacuum is reduced by partially backfilling with an inert gas such as argon or nitrogen. When the nickel alloy brazing material melts, it flows by capillary action along the joints between the components and around the heating element 20 to completely embed it in the spiral channel 22. This brazing in the vacuum furnace provides a metallurgical bonding of the nickel alloy to the steel of the various components to form a metallurgically monolithic integral structure 54. After the structure 54 is cooled and removed from the vacuum furnace, it is machined to provide the dimensional integrity required of a finished product, with the forward end 18 of the nozzle body 12 having a predetermined shape for a particular gating configuration.

Referring now to FIGS. 3 and 3A, the terminal 30 of the nozzle 10 is completed by mounting a cylindrical shaped insulative connector 56 and a disc shaped resilient seal 58 in a removable steel cap 60 to the integral structure 54 described above. In this embodiment of the invention the insulative connector 56 has a pair of spaced parallel bores 62 extending longitudinally therethrough. Each longitudinal bore 62 is large enough in diameter to receive an external electrical lead 64 through its outer end 66, and has a larger diameter portion 68 extending from its inner end 70. In this embodiment, the connector 56 is made of a suitable ceramic material, but in other embodiments it can be made of high temperature plastic of other suitable insulative materials. The insulative connector 56 also has an opening 72 extending transversely into each longitudinal bore 62. Each transverse opening 72 is threaded to receive a short set screw 74. In this embodiment, the two transverse openings 72 extend from opposite sides of the insulative connector 56 to avoid structurally weakening it. In this embodiment, the resilient seal 58 is made of silicon rubber and also has a pair of spaced parallel bores 76 extending therethrough to align with the longitudinal bores 62 through the insulative connector 56. The resilient seal 58 has a tapered outer 10 surface 78 which fits securely in an opening 80 in the outer end 82 of the cap 60. The hollow cap 60 also has a threaded inner end 84 which screws onto the threaded stud 50 to hold the insulative connector 56 and resilient seal 58 securely in place. Mounting the steel cap 60 over the ceramic connector 56 gives the electrical terminal considerable structural strength to ensure it is not accidentally damaged during use.

Connection of the external electrical leads 64 having bared inner end positions 86 will now be described with reference to FIG. 3. The insulative connector 56 is mounted with the outer ends 88 of the insulating material 34 and protective casing 36 of the heating element 20 received in the larger diameter portions 68 of its longitudinal bores 62. In this position, the outer end portion 40 of each conductive wire 38 extends a predetermined distance into one of the longitudinal bores 62 of the insulative connector 56. The outer end portions 40 of the conductive wires 38 are preferably stamped to give them a concave cross section to ensure a good electrical connection with the inner end portions 86 of the external leads 64. The external leads 64 are inserted in through the opening 80 in the outer end 82 of the cap 60 and through the respective bores 76 in the resilient seal 58. The cap 60 and resilient seal 58 slide up the leads 64 out of the way and the leads 64 are then inserted into the respective longitudinal bores 62 in the insulative connector 56 through their outer ends 66 until their bared inner end portions 86 overlap the outer end portions 40 of the conductive wires 38 by a predetermined amount. The set screws 74 are then tightened in the transverse openings 72 in the insulative connector 56 to secure the overlapping outer end portions 40 and inner end portions 86 together. The resilient seal 58 and cap 60 are then slid into place with the cap 60 covering the insulative connector 56 and the threaded inner end 84 of the cap 60 is tightened onto the threaded stud 50. The bores 76 through the resilient seal 58 are made to fit the external leads 64 and tightening the cap 60 over the seal 58 ensures a seal is provided to prevent moisture entering into the longitudinal bores 62 in the insulative connector 56 and also prevents damage to the connector 56. This arrangement ensures the terminal has very good electrical connections and considerably facilitates connecting and disconnecting the external leads 64 to the nozzle. The combination of the steel cap 60 fitting over the insulative connector 56 protects the ceramic connector 56 and avoids any loss of structural strength due to the connections being made in a ceramic connector.

In use, the nozzle 10 is mounted in a suitable mold with the insulation flange portion 90 received in a suitable seat. The external leads 64 are connected as described above and they provide electrical power to heat the nozzle 10 to a predetermined operating temperature. Pressurized melt from a molding machine is injected through the central melt bore 14 in the nozzle 10 according to the injection cycle.

While the description of the nozzle 10 has been given with respect to a preferred embodiment, it will be evident that various modifications are possible without departing from the scope of the invention as understood by those skilled in the art and as defined in the following claims. In particular, as mentioned above, some low voltage nozzles only require a single external lead 64. In this embodiment, the insulative connector 56 and resilient seal 58 only require a single longitudinal bore rather than the pair of spaced parallel bores described above.

The embodiments of the invention in which an exclusive property or privilege is claimed are defined as follows:

I claim:

1. In an injection molding nozzle having a body with a rear end, an electrical heating element extending in the body, and an electrical terminal extending outwardly from the body adjacent the rear end of the body, the heating element having at least one rear portion extending outwardly to the terminal to receive electrical power through at least one external lead, the at least one rear portion of the heating element having an electrically conductive wire surrounded by insulation inside a protective casing, the improvement wherein;

the body has a threaded stud projecting outwardly adjacent the rear end of the body, the at least one rear portion of the heating element projects outwardly through the stud with an outer end portion of the conductive wire extending a predetermined distance past the insulation and protective casing, an insulative connector having at least one longitudinal bore with an inner end and an outer end extending therethrough is mounted with the at least one projecting rear portion of the heating element extending outwardly into the at least one longitudinal bore through the inner end with the outer end portion of the conductive wire to overlap with a bared inner end portion of the at least one external lead inserted inwardly through the outer end of the at least one longitudinal bore, the insulative connector having at least one transverse opening extending into the at least one longitudinal bore, the at least one transverse opening having thread means to receive screw means, said screw means securing the overlapping outer end portion of the conductive wire and the inner end portion of the at least one external lead together, a hollow cap having a threaded inner end and an outer end with an opening therethrough to be mounted over the insulative connector and screwed onto the threaded stud to secure the insulative connector in place with the at least one external lead extending inwardly through the opening in the outer end of the cap into the at least one longitudinal bore in the insulative connector.

2. An injection molding nozzle as claimed in claim 1 to receive electrical power through a pair of external leads each having a bared inner end portion, wherein the insulative connector has a pair of spaced parallel longitudinal bores extending therethrough, the electrical heating element has a pair of rear portions projecting outwardly through the stud, each rear portion extending outwardly into a respective one of the longitudinal bores in the insulative connector with the outer end portion of the conductive wire overlapping the inner end portion of a respective one of the inwardly extending external leads, the insulative connector having a transverse opening extending into each of the longitudinal bores, each transverse opening of the insulative connector having thread means to receive screw means, said screw means securing the outwardly extending outer end portion of the respective rear portion of the heating element together with the overlapping inwardly extending inner end portion of the external lead.

3. An injection molding nozzle as claimed in claim 2 wherein a resilient seal is mounted in the hollow cap between the insulative connector and the outer end of the cap, the resilient seal having a pair of spaced parallel bores extending therethrough in alignment with the longitudinal bores through the insulative connector, each of the bores through the resilient seal receiving a respective one of the external leads therethrough with the bore fitting the external lead to provide a seal against moisture entering into the longitudinal bore in the insulative connector.

4. An injection molding nozzle as claimed in claim 3 wherein the insulative connector is formed of ceramic material.

* * * * *